(12) United States Patent
Hayashi

(10) Patent No.: US 6,930,725 B1
(45) Date of Patent: Aug. 16, 2005

(54) INFORMATION PROCESSING APPARATUS

(75) Inventor: Kaoru Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/340,764

(22) Filed: Jun. 28, 1999

(30) Foreign Application Priority Data

Jun. 30, 1998 (JP) .................................. 10-184359

(51) Int. Cl.[7] ........................ H04N 5/225; H04N 11/00; H04N 7/00
(52) U.S. Cl. ................... 348/373; 348/207.1; 348/375; 348/552
(58) Field of Search ............................. 348/207.1, 373, 348/375, 552

(56) References Cited

U.S. PATENT DOCUMENTS

| | | | |
|---|---|---|---|
| 5,128,705 A * | 7/1992 | Someya et al. ............. 396/123 |
| D363,471 S * | 10/1995 | Shima et al. .............. D14/317 |
| 5,491,507 A * | 2/1996 | Umezawa et al. ....... 348/14.02 |
| 5,537,175 A | 7/1996 | Kamaya et al. |
| 5,768,163 A * | 6/1998 | Smith, II .................... 708/105 |
| 5,801,919 A * | 9/1998 | Griencewic ................. 361/683 |
| 5,825,408 A * | 10/1998 | Yuyama et al. .......... 348/14.01 |
| 5,880,928 A * | 3/1999 | Ma ............................. 361/683 |
| 5,903,706 A * | 5/1999 | Wakabayashi et al. ...... 386/117 |
| 6,118,485 A * | 9/2000 | Hinoue et al. ............... 348/373 |
| 6,141,052 A * | 10/2000 | Fukumitsu et al. ......... 348/373 |
| 6,417,884 B1 * | 7/2002 | Chang et al. ............... 348/373 |
| 6,445,417 B1 * | 9/2002 | Yoshida et al. ............. 348/374 |

FOREIGN PATENT DOCUMENTS

| | | |
|---|---|---|
| EP | 0 683 596 | 11/1995 |
| EP | 0 757 478 | 2/1997 |

OTHER PUBLICATIONS

"Camera Tilt Mechanism", IBM Technical Disclosure Bulletin, U.S., IBM Corp. New York, vol. 39, No. 4, Apr. 1, 1996, pp. 311-313.

* cited by examiner

Primary Examiner—James J. Groody
Assistant Examiner—Brian C Genco
(74) Attorney, Agent, or Firm—Frommer Lawrence & Haug LLP; William S. Frommer; Leonard J. Santisi

(57) ABSTRACT

The invention provides an information processing apparatus having an image pickup apparatus incorporated therein, said image pickup apparatus comprising image pickup means for picking up an image of an object, holding means for holding thereon a lens for forming an image on said image pickup means, said holding means having a serrated circumferential portion thereon, moving means for fitting with said serrated circumferential portion of said holding means to move, when said moving means is turned, said holding means along a direction of an optical axis of said lens and accommodation means for accommodating said holding means and said moving means therein. With the information processing apparatus, the holding means is moved in a direction of the optical axis of the lens by turning the moving means. Consequently, the focus of the lens can be adjusted to the object.

4 Claims, 14 Drawing Sheets

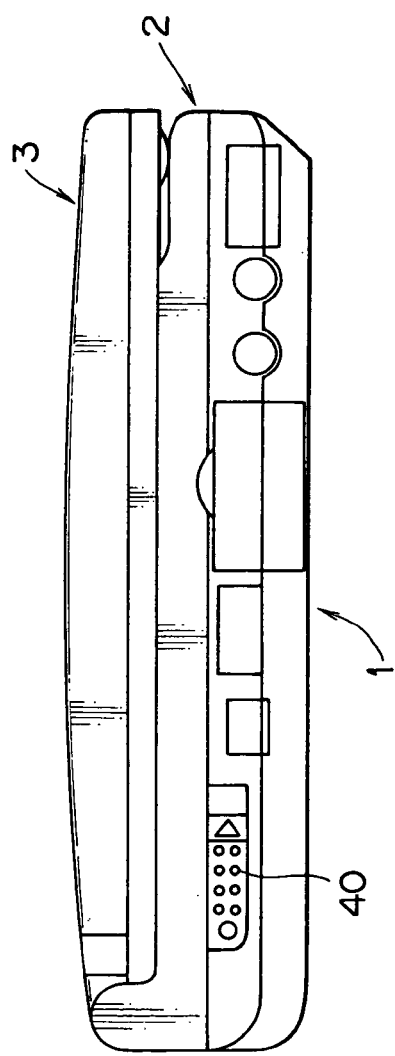
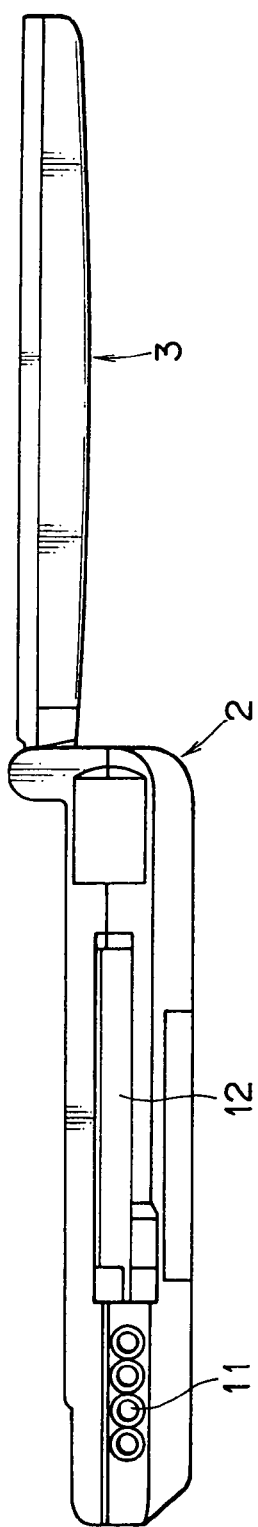

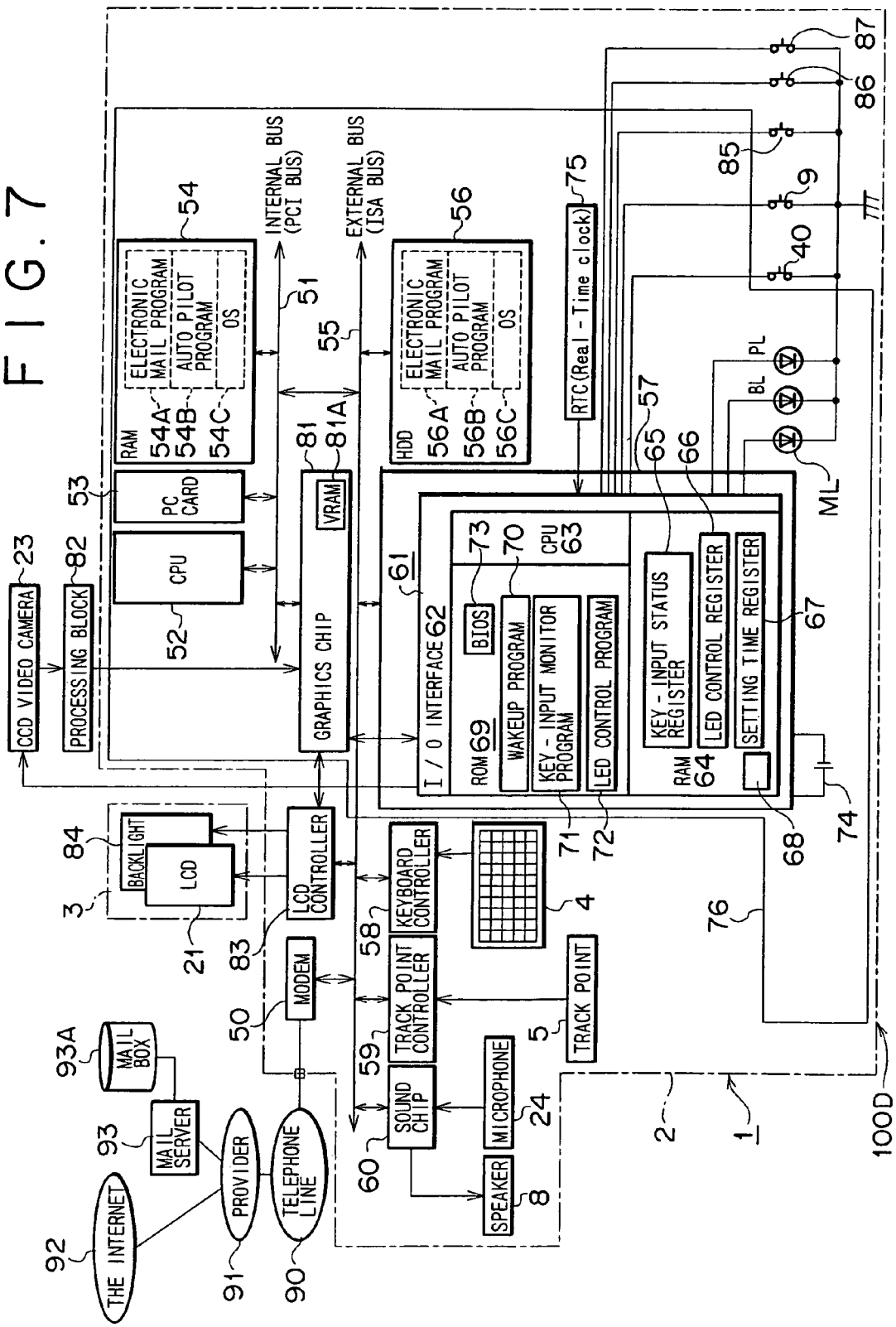

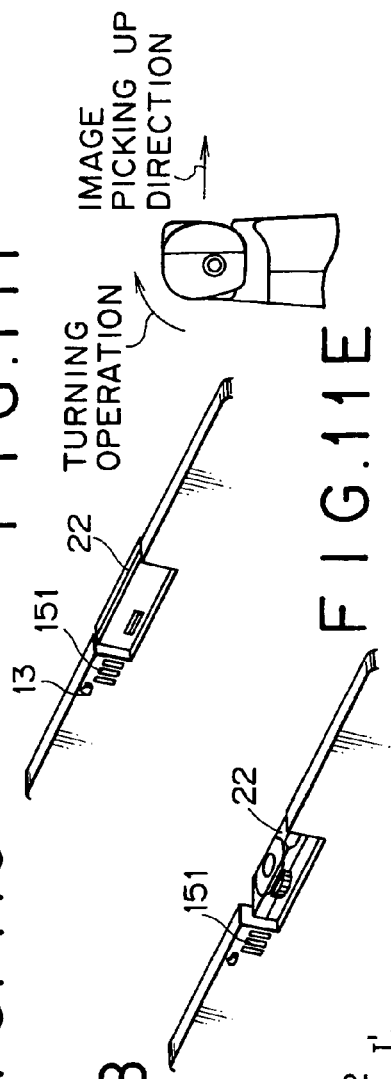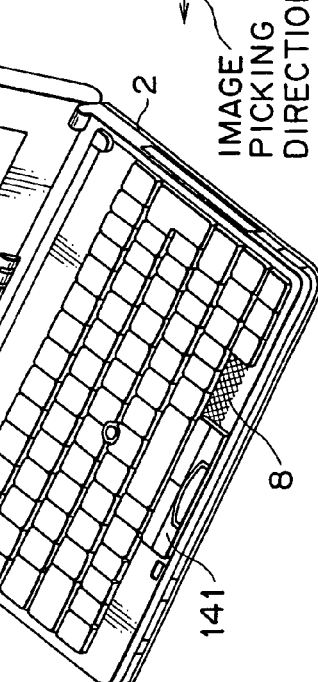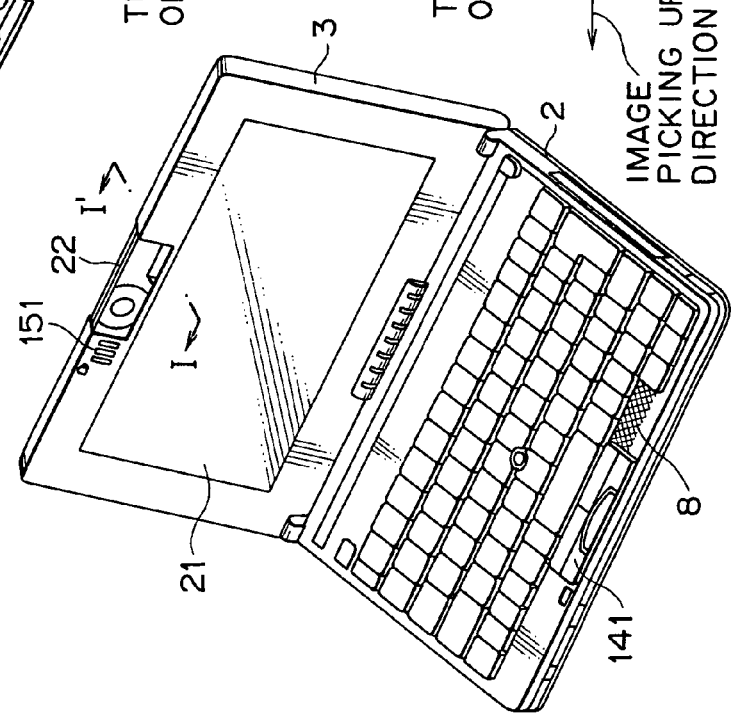

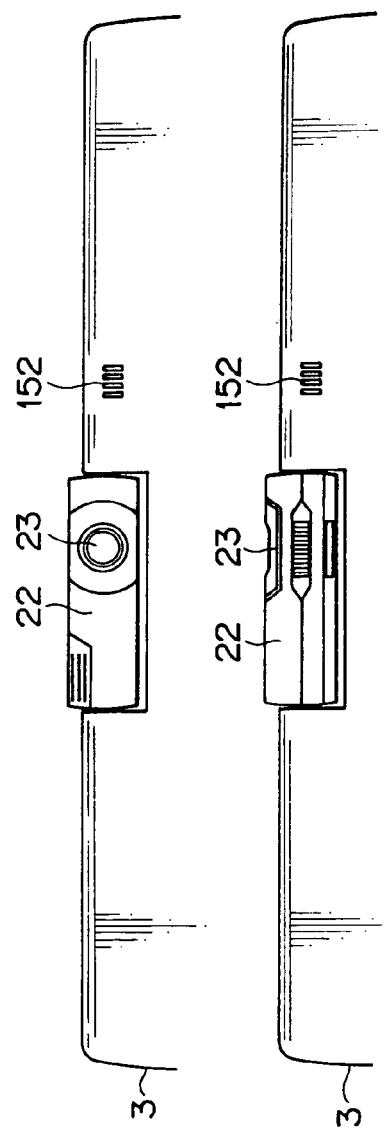
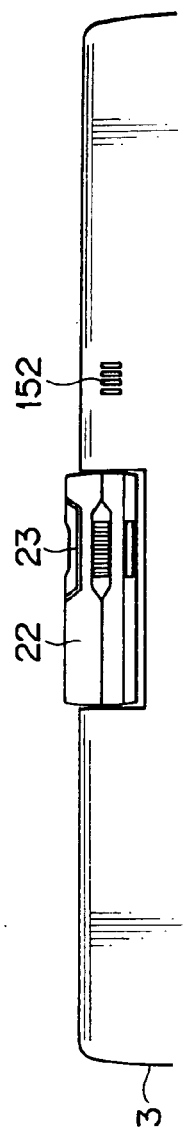
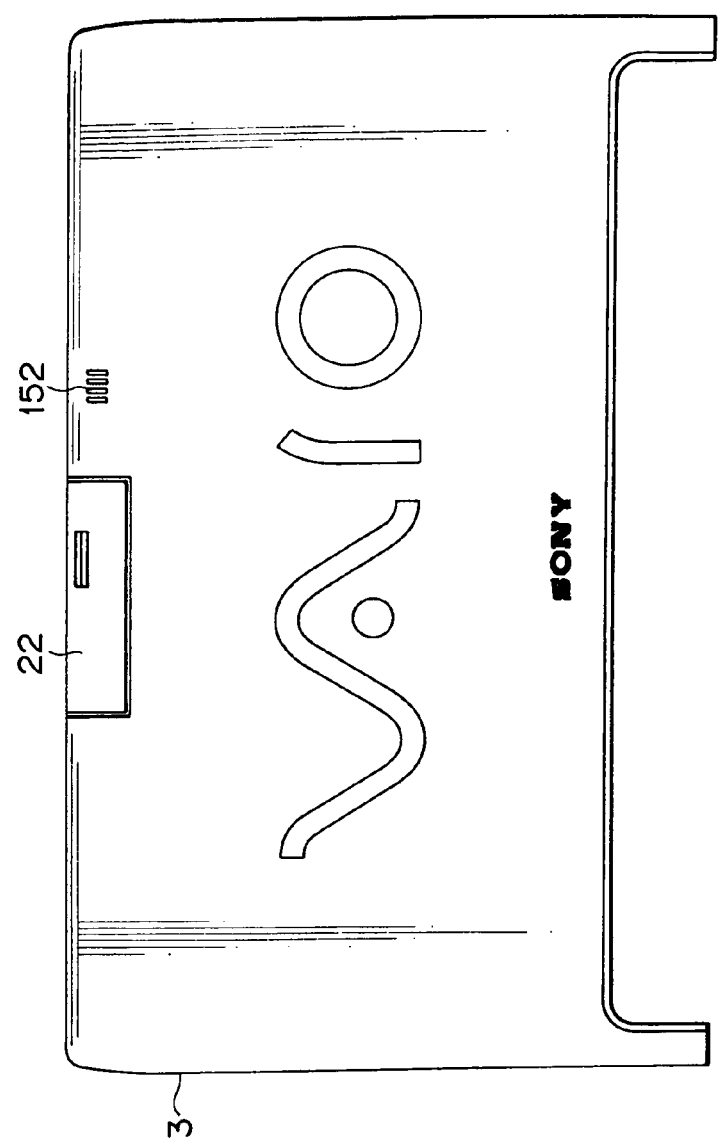
FIG. 13A
FIG. 13B
FIG. 13C

INFORMATION PROCESSING APPARATUS

BACKGROUND OF THE INVENTION

1. Field of the Invention

This invention relates to an information processing apparatus, and more particularly to an information processing apparatus in which a CCD (Charge Coupled Device) video camera having a focus adjustable to an object is incorporated.

2. Description of the Related Art

An assignee of the present patent application proposed an apparatus which incorporates a CCD video camera in a portable personal computer, and processes image data captured by the CCD video camera and displays the processed image data on a display unit, for example, in Japanese Patent Laid-Open No. 51665/1998. FIGS. 15 and 16 show the apparatus disclosed in the document.

Referring first to FIG. 15, a personal computer 161 includes a body section 162 in the form of a housing having a rectangular configuration of a small thickness, and a display panel section 165 formed from a housing of a size substantially equal to that of the body section 162 and mounted for pivotal opening and closing movement on the body section 162 for displaying graphics, characters and so forth thereon. When the personal computer 161 is used, the display panel section 165 is pivoted upwardly into an open condition from the body section 162 as seen in FIG. 15, but when the personal computer 161 is not used, the display panel section 165 is pivoted downward into a closed condition on the body section 162.

The body section 162 has manually operable elements provided thereon which are manually operated by a user such as a keyboard 163 and a track pad 164. Data are inputted to or outputted from the personal computer 161 by operation of the keyboard 163 and/or the track pad 164. The body section 162 further has a circuit board (not shown) incorporated therein. The circuit board has a CPU (Central Processing Unit), a ROM (Read Only Memory), a RAM (Random Access Memory) and other required elements (all not shown) mounted thereon.

The display panel section 165 has a liquid crystal display unit 166 provided thereon for displaying graphics, characters and so forth. The display panel section 165 further has a mounting groove 167 formed at a central position thereof above the liquid crystal display unit 166 in FIG. 15, and a CCD video camera 169 is mounted for sliding movement in the mounting groove 167.

The mounting groove 167 has a recessed structure formed by partly removing the material of the display panel section 165 at the upper central position into a substantially U-shape. The CCD video camera 169 is supported by a support member 168 provided in the mounting groove 167. An image formed on the CCDs (not shown) in the CCD video camera 169 is fetched into the personal computer 161 over a cable not shown.

FIG. 16 particularly shows the CCD video camera 169. Referring to FIG. 16, the support member 168 secured to the display panel section 165 has a cup-shaped supporting curved face 168b having a curvature same as that of a turning sphere 175 of the CCD video camera 169. The support member 168 holds the turning sphere 175 with the supporting curved face 168b thereof to support the turning sphere 175 for turning motion.

The CCD video camera 169 includes a camera body section 171 formed in a substantially spherical profile, a lens section 172 extending tubularly from the camera body section 171, a turning shaft 174 connected to a portion of the camera body section 171, and the turning sphere 175 formed from a sphere connected to the other end of the turning shaft 174. A cable 173 extends from the camera body section 171 and is connected to a suitable internal member of the personal computer 161. The camera body section 171 can be slidably moved around the center of the turning sphere 175 so that it can pick up an image over a predetermined range through the lens section 172 thereof.

Since the CCD video camera 169 includes the turning shaft 174 of a predetermined length in this manner, if a force is applied to the camera body section 171 to vary the direction of the camera body section 171, then a pivoting force is imparted through the turning shaft 174 to the turning sphere 175. In other words, the direction of the camera body section 171 can be varied around the center of the turning sphere 175 to suitably vary the image pickup range of the CCD video camera 169. When no pivoting force is applied, the turning sphere 175 is not turned in the support member 168 and fixedly supports the camera body section 171 thereby to maintain the image pickup direction of the camera body section 171.

However, although the CCD camera incorporated in the personal computer described above allows suitable variation of the image pickup range, it has a subject to be solved in that it does not allow suitable focusing on an object to be image picked up.

SUMMARY OF THE INVENTION

It is an object of the present invention to provide an information processing apparatus wherein a CCD camera incorporated therein can be focused suitably on an object.

In order to attain the object described above, according to the present invention, there is provided an information processing apparatus having an image pickup apparatus incorporated therein, the image pickup apparatus including image pickup means for picking up an image of an object, holding means for holding thereon a lens for forming an image on the image pickup means, the holding means having a serrated circumferential portion thereon, moving means for fitting with the serrated circumferential portion of the holding means to move, when the moving means is turned, the holding means along a direction of an optical axis of the lens, and accommodation means for accommodating the holding means and the moving means therein.

With the information processing apparatus, the holding means is moved in a direction of the optical axis of the lens by turning the moving means. Consequently, the focus of the lens can be adjusted to an object.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a left-hand side elevational view of the portable personal computer of FIG. 1 when the display section is closed with respect to the body;

FIG. 4 is a right-hand side elevational view of the portable personal computer of FIG. 1 but when the display section is pivotally opened by 180 degrees with respect to the body;

FIG. 7 is a block diagram showing an electric circuit of the portable personal computer of FIG. 1;

FIGS. 11A to 11C are schematic and partial schematic views illustrating pivotal movements of the image pickup section of FIG. 10, and FIGS. 11D to 11F are side elevational views illustrating the pivotal movements of the image pickup section corresponding to those of FIGS. 11A to 11C, respectively;

FIGS. 13A, 13B and 13C are partial schematic views and a schematic plan view illustrating pivotal movements of the image pickup section of FIG. 10 when the display section is pivotally closed with respect to the body;

DESCRIPTION OF THE PREFERRED EMBODIMENT

Before a preferred embodiment of the present invention is described, in order to make clear a corresponding relationship between various features recited in the claims and elements of the embodiment of the present invention described below, the features of the present invention are described below together with the corresponding elements to which reference symbols denoting them are added in parentheses following them. However, this description provides a mere example and does not signify that the features of the present invention be limited to the recited elements.

An information processing apparatus according to claim 1 has an image pickup apparatus incorporated therein, which comprises image pickup means (for example, a CCD 114 shown in FIG. 9B) for picking up an image of an object, holding means (for example, a lens-barrel section 102 shown in FIG. 9B) for holding thereon a lens for forming an image on the image pickup means, the holding means having a serrated circumferential portion thereon, moving means (for example, a focus adjustment ring 25 shown in FIG. 9B) for fitting with the serrated circumferential portion of the holding means to move, when the moving means is turned, the holding means along a direction of an optical axis of the lens, and accommodation means (for example, a CCD video camera unit 101 shown in FIGS. 8A and 8B) for accommodating the holding means and the moving means therein.

In the following, an information processing apparatus according to a preferred embodiment of the present invention is described in detail.

Figure 1:
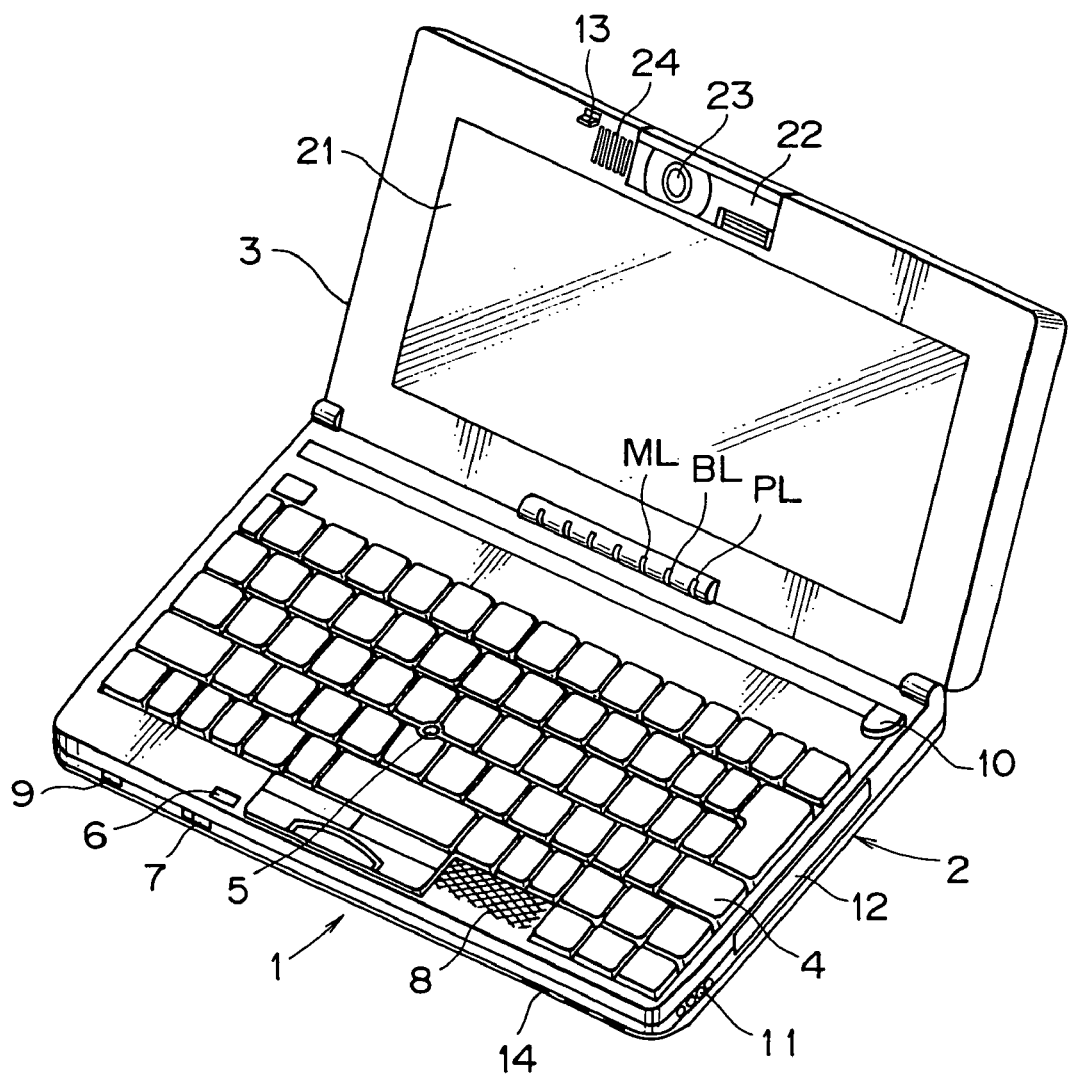
FIG. 1 is a perspective view showing a portable personal computer to which the present invention is applied when a display section is pivotally opened with respect to a body.
Figure 2:
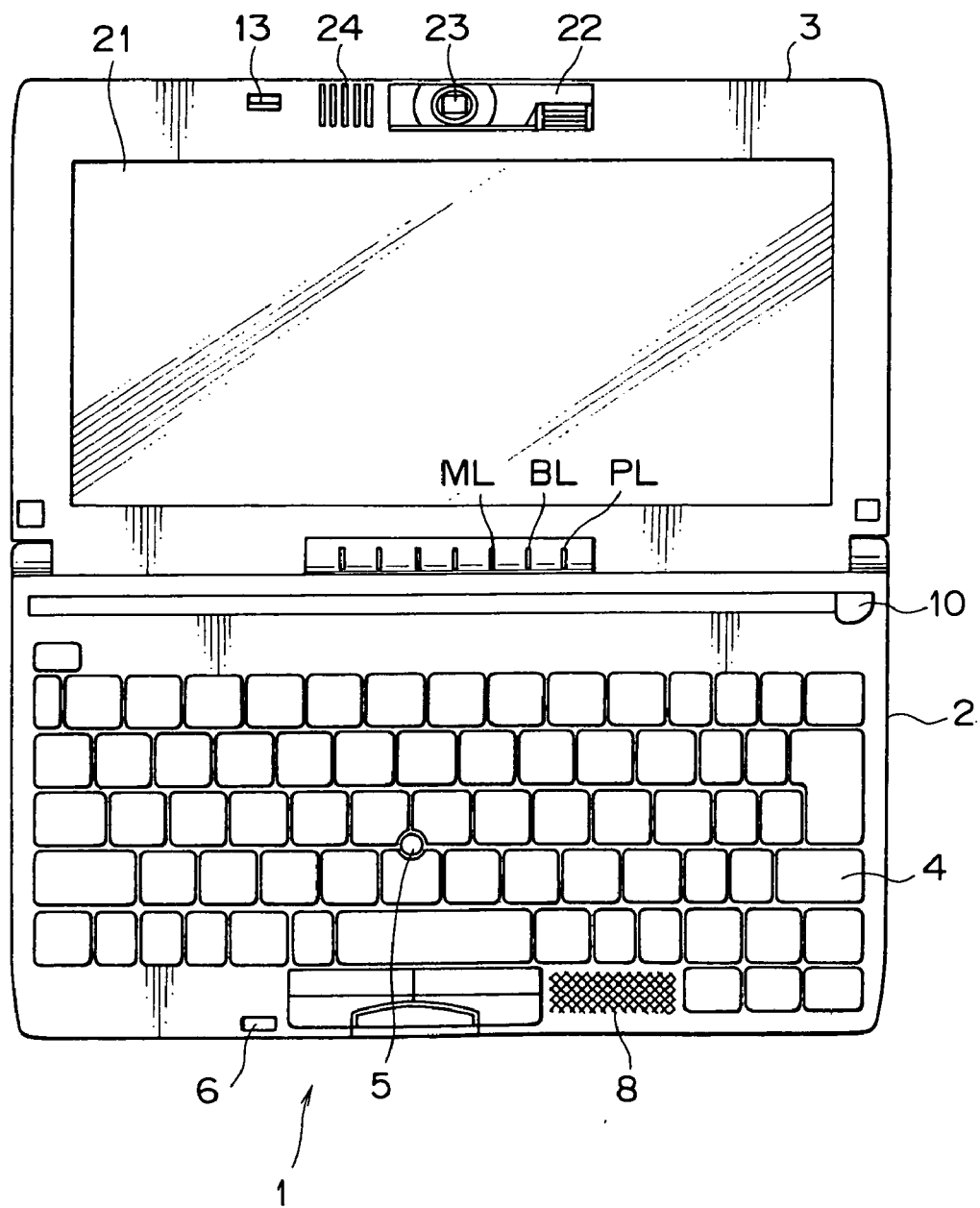
FIG. 2 is a plan view of the portable personal computer shown in FIG. 1.
Figure 5:
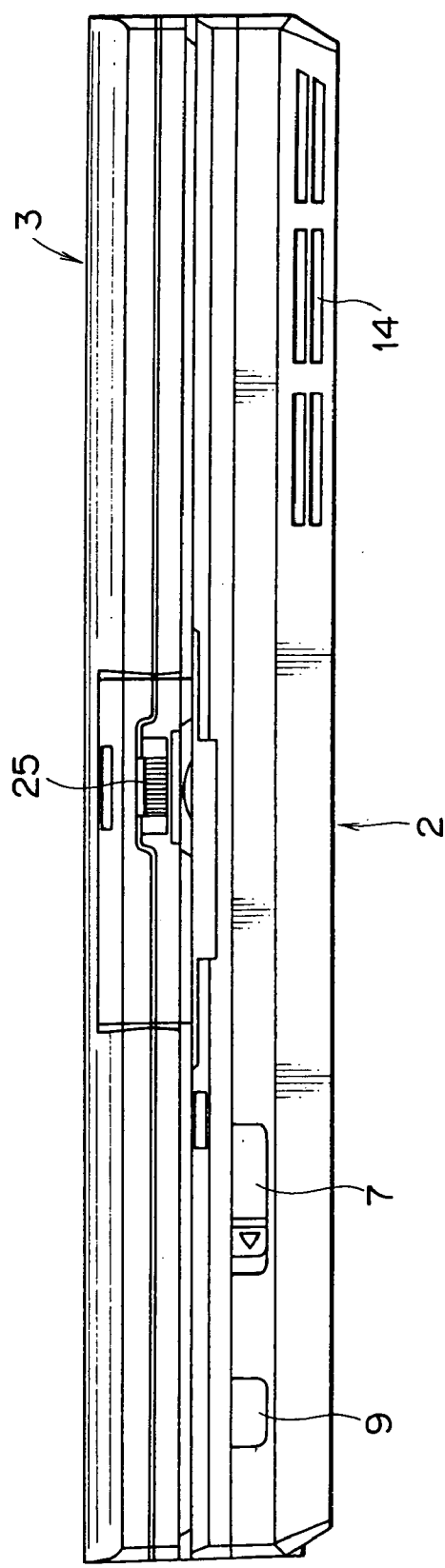
FIG. 5 is a front elevational view of the portable personal computer shown in FIG. 3.
Figure 6:
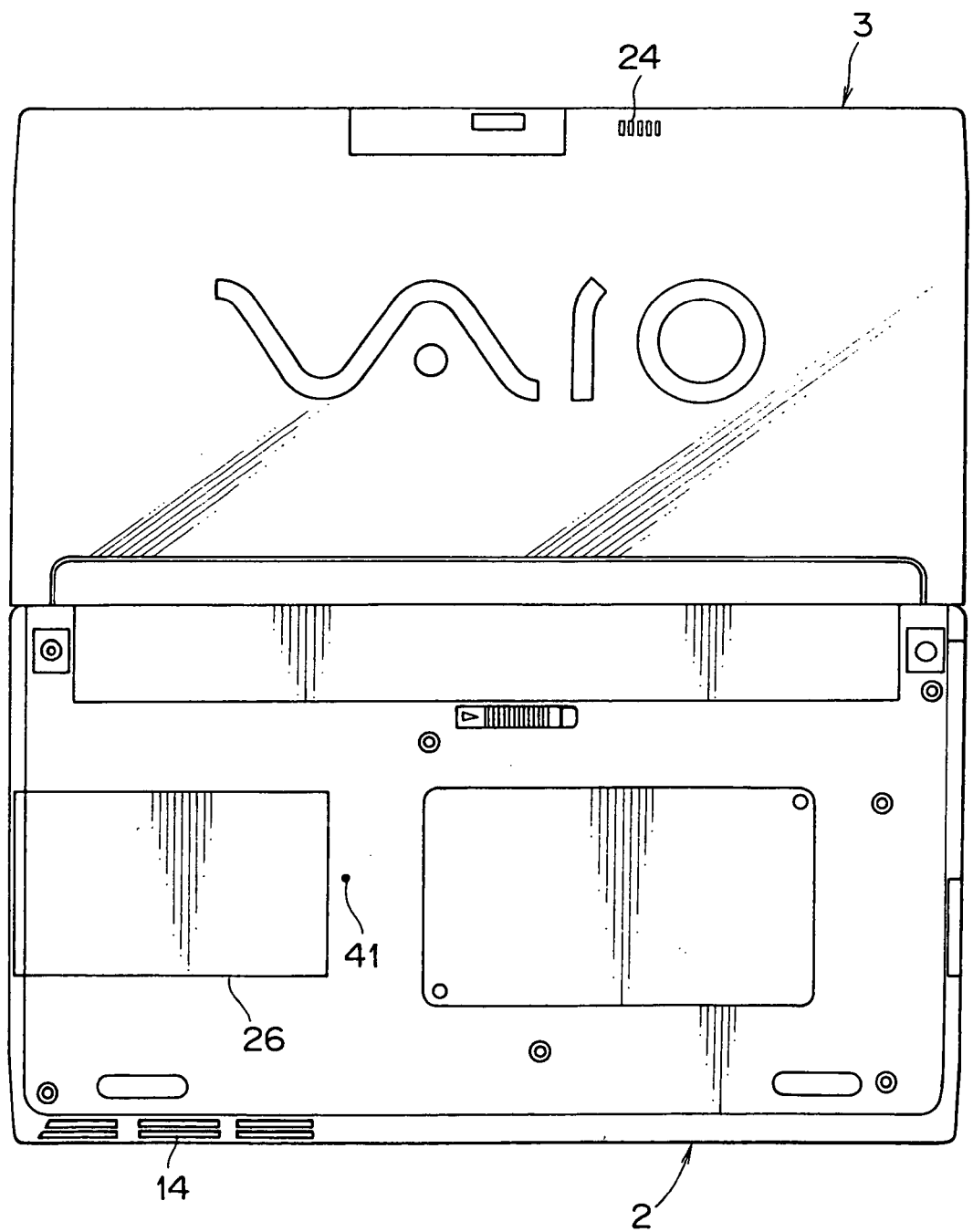
FIG. 6 is a bottom plan view of the portable personal computer shown in FIG. 4.

Referring first to FIGS. 1 to 6, there is shown a portable personal computer to which the present invention is applied. The personal computer shown generally denoted at 1 is a personal computer of the mini notebook type and includes, as basic components thereof, a body 2 and a display section 3 mounted for pivotal opening and closing movement with respect to the body 2 along an axis extending along a direction of the rear side of the body 2. In FIG. 2, the display section 3 is opened with respect to the body 2; FIG. 3 is a left-hand side view illustrating the personal computer 1 with the display section 3 closed with respect to the body 2; FIG. 4 is a right-hand side view illustrating the personal computer 1 with the display section 3 opened by 180 degrees with respect to the body 2; FIG. 5 is a front elevational view of the personal computer 1 shown in FIG. 3 and FIG. 6 is a bottom plan view of the personal computer 1 shown in FIG. 4.

A keyboard 4 and a track point (trademark) 5 are mounted on an upper face of the body 2. The keyboard 4 is operated to input various characters, symbols and so forth, and the track point 5 is operated to move a mouse cursor and so forth. Also a speaker 8 which outputs sound and a shutter button 10 are provided on the upper face of the body 2. The shutter button 10 is operated to pick up an image of an object by means of a CCD video camera 23 which is provided on the display section 3.

A claw 13 is provided at an upper end of the display section 3 in FIG. 1, and a hole 6 into which the claw 13 is to be fitted is provided open at a position of the body 2 which opposes the claw 13 when the display section 3 is closed with respect to the body 2 as seen in FIG. 3. A slide lever 7 is mounted on a front face of the body 2 for sliding movement in parallel to the front face of the body 2 to and from a position in which it engages with the claw 13 fitted in the hole 6 to lock the claw 13 and hence lock the display section 3 to its closed position. When the claw 13 is unlocked from the slide lever 7, the display section 3 can be pivoted with respect to the body 2. A microphone 24 is mounted adjacent the claw 13. The microphone 24 can collect sound also from the back of the personal computer 1 as seen from FIG. 6.

Also a programmable power key (PPK) 9 is provided in the front face of the body 2. An exhaust hole 11 is formed on a right-hand side wall of the body 2, and an intake hole 14 is formed at a lower portion of the front face of the body 2 as seen in FIG. 5. Further, a slot 12 for receiving a PCMCIA (Personal Computer Memory Card International Association) card (PC card) is formed on the right side of the exhaust hole 11.

An LCD (Liquid Crystal Display) 21 for displaying an image thereon is provided on the front face of the display section 3, and an image pickup section 22 is mounted at an upper end of the LCD 21 in FIG. 1 for pivotal motion with respect to the display section 3. In particular, the image pickup section 22 is mounted for turning to any position within a range of 180 degrees from the direction of the LCD 21 to the opposite direction. The CCD video camera 23 is mounted on the image pickup section 22.

A power supply lamp PL, a battery lamp BL, a message lamp ML and other necessary lamps which may be formed from light emitting diodes (LEDs) are provided at lower portions of the display section 3 in FIG. 1 adjacent the body 2. It is to be noted that reference numeral 40 shown in FIG. 3 denotes a power supply switch provided on the left side face of the body 2, and 25 shown in FIG. 5 denotes an adjustment ring for adjusting the focus of the CCD video camera 23. Further, reference numeral 26 shown in FIG. 6 denotes a lid which covers over an opening through which an add-on memory is to be loaded into the body 2, and reference numeral 41 denotes a small hole into which a pin for disengaging the locking pawl of the lid 26 is to be inserted.

FIG. 7 shows an internal structure of the personal computer 1. Referring to FIG. 7, a CPU (Central Processing Unit) 52, a PC card 53 which is loaded into the personal computer 1 when necessary, a RAM (Random Access Memory) 54 and a graphics chip 81 are connected to an internal bus (PCI (Peripheral Component Interconnect)) 51. The internal bus 51 is connected to an external (ISA (Industrial Standard Architecture) bus 55, and a hard disk drive (HDD) 56, an I/O (input/output) controller 57, a keyboard controller 58, a track point controller 59, a sound chip 60, an LCD controller 83, a modem 50 and other required devices are connected to the external bus 55.

The CPU 52 serves as a controller for controlling various functions. The PC card 53 is suitably loaded in order to add an optional function to the personal computer 1.

The RAM 54 has, at a point of time when start-up is completed, an electronic mail program (application program) 54A, an auto pilot program (application program) 54B and an OS (operating system) 54C stored therein. The programs mentioned are transferred from the HDD 56 to the RAM 54.

The electronic mail program 54A is a program for sending or transferring an electronic message over a network such as a communication line such as a telephone line. The electronic mail program 54A has an in-coming mail capturing function as a particular function. The in-coming mail capturing function checks a mail box 93A of a mail server 93 for a mail addressed to that user and if such a mail is found, captures the same.

The auto pilot program 54B is a program for successively starting a plurality of processes (or programs) set in advance in a predetermined order.

The OS (basic program software) 54C controls basic operation of the computer represented by the Windows95 (trademark).

Meanwhile, the hard disk drive (HDD) 56 of the external bus 55 side has an electronic mail program 56A, an auto pilot program 56B and an OS (basic program software) 56C stored therein. The OS 56C, auto pilot program 56B and electronic mail program 56A in the hard disk drive 56 are successively transferred to and stored into the RAM 54 in a procedure of start-up (boot-up) processing.

The I/O controller 57 includes a microcontroller 61 provided with an I/O interface 62. The microcontroller 61 includes, in addition to the I/O interface 62, a CPU 63, a RAM 64 and a ROM 69 which are connected to each other. The RAM 64 includes a key-input status register 65, an LED (light emitting diode) control register 66, a setting time register 67, and a register 68. The setting time register 67 is used to start operation of a start-up sequence control section 76 when a time (start-up condition) set in advance by the user comes. The register 68 stores a correspondence between a combination (start-up condition) of operation keys set in advance and an application program to be started up. When the stored combination of operation keys is inputted by the user, then the stored application program (for example, an electronic mail) is started up.

The key-input status register 65 stores an operation key flag when the programmable power key (PPK) 9 for single-touch operation is depressed. The LED control register 66 controls the turn-on/off of the message lamp ML which indicates a start-up condition of an application program (electronic mail program) stored in the register 68. The setting time register 67 accepts setting of an arbitrary time.

A backup battery 74 is connected to the microcontroller 61 so that stored values of the key-input status register 65, LED control register 66 and setting time register 67 may be maintained when the power supply to the body 2 is off.

The ROM 69 in the microcontroller 61 has a wakeup program 70, a key-input monitor program 71 and an LED control program 72 stored in advance therein. The ROM 69 is formed from, for example, an EEPROM (electrically erasable and programmable read only memory). The EEPROM is also called flash memory. Further, an RTC (Real-Time Clock) 75 which normally counts the present time is connected to the microcontroller 61.

The wakeup program 70 in the ROM 69 is a program to check based on the present time data supplied thereto from the RTC 75 whether or not a time set in advance in the setting time register 67 comes and starts up a predetermined process (or program) or the like when the set time comes. The key-input monitor program 71 is a program for normally supervising whether or not the programmable power key (PPK) 9 is depressed by a user. The LED control program 72 is a program for controlling the turn-on/off of the message lamp ML.

The ROM 69 has a BIOS (Basic Input/Output System) 73 written therein. The BIOS is a basic input/output system and is a software program for controlling the transfer (input/output) of data between an OS or application software and a peripheral equipment (display unit, keyboard, hard disk drive or the like).

The keyboard controller 58 connected to the external bus 55 controls inputting from the keyboard 4. The track point controller 59 controls inputting of the track point 5.

The sound chip 60 fetches an input from the microphone 24 or supplies an audio signal to the speaker 8.

The modem 50 connects the personal computer 1 to a communication network 92 such as the Internet or the mail server 93 through a public telephone line 90 or an Internet service provider 91.

The graphics chip 81 connected to the internal bus 51 receives, as input data thereto, image data captured by the CCD video camera 23 and processed in a processing block 82. The graphics chip 81 stores video data inputted thereto from the CCD video camera 23 through the processing block 82 into a VRAM (video RAM) 81A built therein and reads out and outputs the data suitably to the LCD controller 83. The LCD controller 83 outputs the image data supplied thereto from the graphics chip 81 to the LCD 21 so that they may be displayed on the LCD 21. A backlight 84 illuminates the LCD 21 from behind.

The power supply switch 40 is operated to switch the power supply on or off. A half depression switch 85 is switched on when the shutter button 10 is depressed into a half-depression condition. A full depression switch 86 is switched on when the shutter button 10 is depressed into a full-depression condition. A reversal switch 87 is switched on when the image pickup section 22 is turned by 180 degrees (when the CCD video camera 23 is turned to a direction to pick up an image on the opposite side to the LCD 21).

Figure 8A:
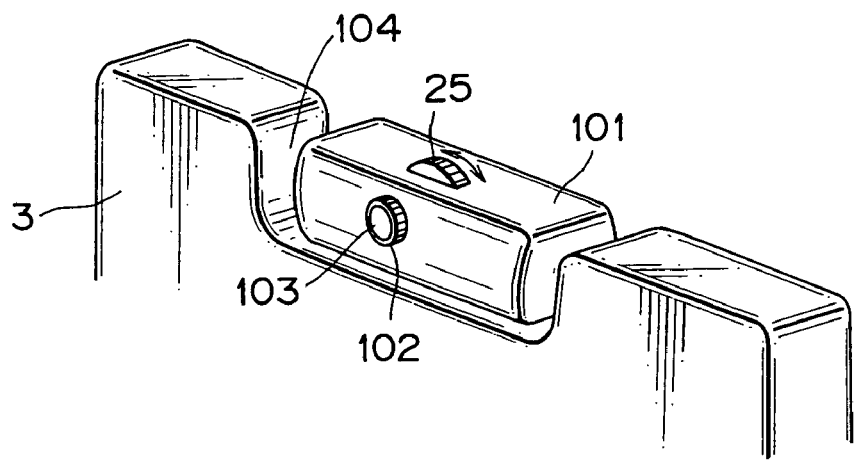
FIGS. 8A and 8B are partial perspective views showing a mounting structure of an image pickup section of the portable personal computer of FIG. 1.
Figure 8B:
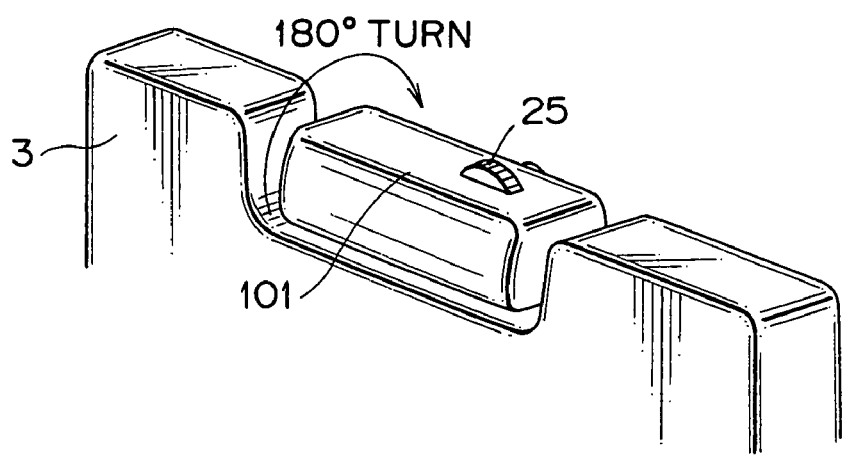

Now, a structure of the image pickup section 22 is described with reference to FIGS. 8A to 11C. Referring first to FIG. 8A, the image pickup section 22 is mounted at an upper central portion of the display section 3 for turning motion with respect to the display section 3. In particular, the image pickup section 22 is mounted for turning to any position within a range of 180 degrees from a direction same as the direction of the LCD 21 (FIG. 8A) to the opposite direction (in the direction to the back) (FIG. 8B).

A mounting recess 104 is formed by removing the material of the display section 3 at an upper central position into a U-shape.

The image pickup section 22 includes a CCD video camera unit 101 having a substantially cylindrical profile, a lens-barrel section 102 accommodated in the CCD video camera unit 101, and the focus adjustment ring 25 for slidably moving the lens-barrel section 102 in a direction of an optical axis of a lens 103 mounted therein to adjust the focus position of the lens 103.

Figure 9A:
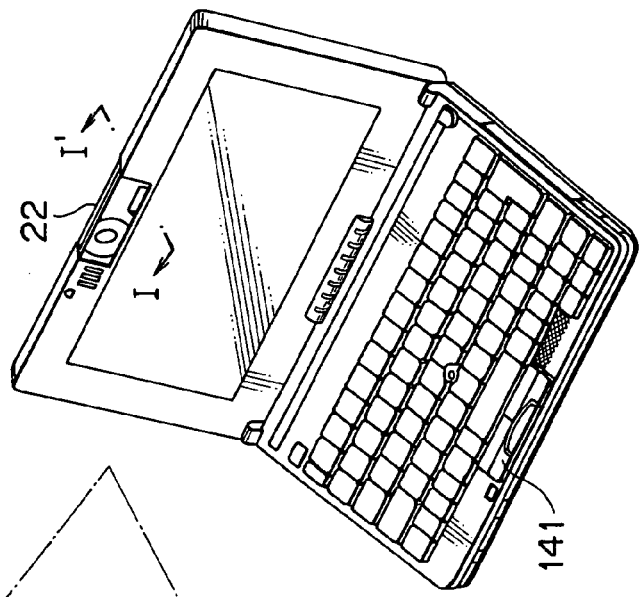
FIG. 9A is a schematic perspective view of the portable personal computer of FIG. 1.
Figure 9B:
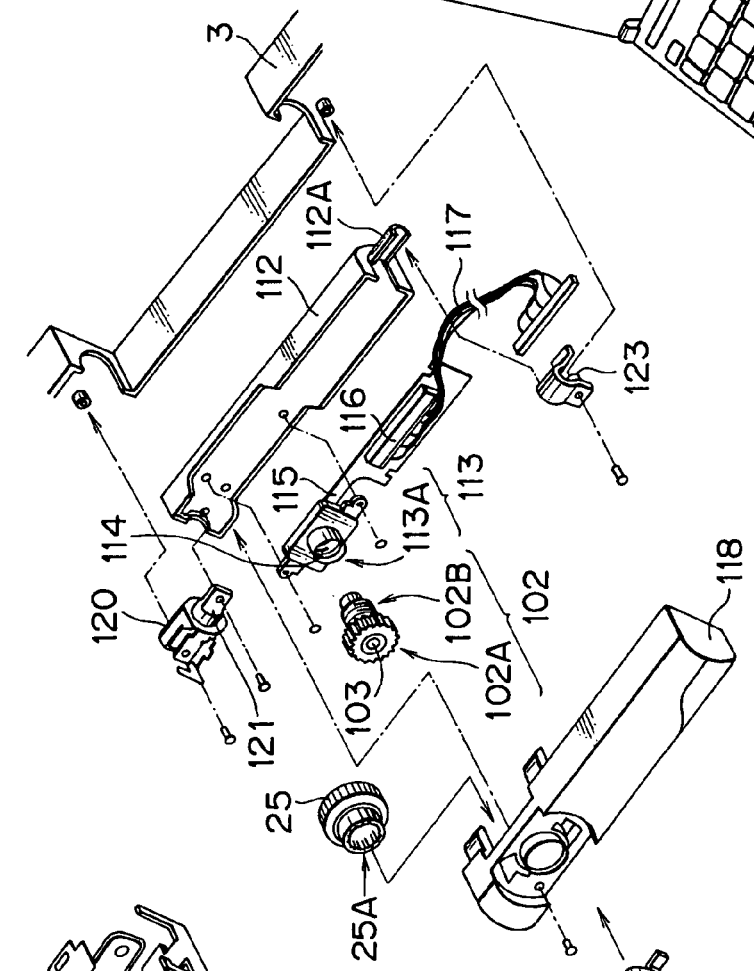
FIG. 9B is a fragmentary perspective view of the image pickup section of the portable personal computer shown in FIG. 1
Figure 9C:
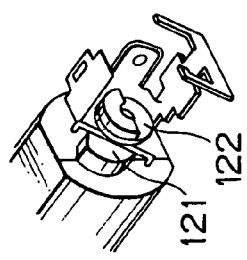
FIG. 9C is a partial perspective view showing a cam of the image pickup section shown in FIG. 9B.

A cable 117 and a CCD 114 are accommodated in the CCD video camera unit 101 and connected to a circuit board in the personal computer 1 as seen in FIG. 9B. The CCD 114 picks up an image of light incident thereto through the lens 103 mounted on the lens-barrel section 102. Image data thus picked up are fetched into the personal computer 1 over the cable 117 and are processed by the personal computer 1 in order to execute various applications.

The focus adjustment ring 25 is manually operated by a user to slidably move the lens-barrel section 102 forwardly or backward (in a direction of the optical axis of the lens 103) in order to focus the lens 103 on an object. Further, the focus adjustment ring 25 is exposed to the upper side and the lower side of the CCD video camera unit 101 so that focusing can be performed by operation thereof not only before the CCD video camera unit 101 is turned (FIG. 8A) but also after the CCD video camera unit 101 is turned by 180 degrees (FIG. 8B).

FIG. 9B particularly shows the internal structure of the image pickup section 22 shown in FIG. 9A. The lens-barrel section 102 has serrations 102A formed on an outer periphery of a front portion thereof, and further has a male screw thread 102B formed on an outer periphery of a rear portion thereof. Further, the lens 103 is attached to the front end of the lens-barrel section 102.

A lens-barrel support 113 is provided to support the lens-barrel section 102, and a female screw thread 113A is formed on a tubular hollow of the lens-barrel support 113. The male screw thread 102B of the lens-barrel section 102 and the female screw thread 113A of the lens-barrel support 113 are held in meshing engagement with each other so that, when the lens-barrel section 102 is turned, it is slidably moved forwardly and backward relative to the lens-barrel support 113 which is secured to a casing 112 by means of a screw. The CCD 114 for forming a picked up image is attached at the back of the interior of the lens-barrel support 113. A flexible board 115 is accommodated in the lens-barrel support 113. A connector 116 is attached to the flexible board 115, and a cable 117 is connected to the connector 116. Image data picked up by the CCD 114 are fetched into the personal computer 1 over the cable 117 accommodated in a hole in a shaft 112A.

The focus adjustment ring 25 has a circular ring structure, and serrations 25A are formed on an inner circumference of a hollow of the focus adjustment ring 25. The serrations 102A of the lens-barrel section 102 are engaged with the serrations 25A of the focus adjustment ring 25 so as to allow sliding movement of the lens-barrel section 102 in the forward and backward directions. Further, the focus adjustment ring 25 is supported for turning motion in a casing 118 so that it may not move in an axial direction thereof. Accordingly, if a user turns the focus adjustment ring 25, then the turning motion is imparted to the lens-barrel section 102 through the serrations 25A and the serrations 102A to slidably move the lens-barrel section 102 in the forward or backward direction. In other words, the user can focus the lens 103 on an object.

The focus adjustment ring 25, lens-barrel section 102, lens-barrel support 113, flexible board 115, connector 116 and cable 117 are accommodated in the casing 112 and the casing 118 thereby to form the CCD video camera unit 101. A panel 119 is mounted on the casing 118.

The shaft 112A is formed at a right-hand side end portion of the casing 112 and supported for rotation by a bearing 123 secured to the display section 3 by means of a screw. Meanwhile, a shaft 121 is secured to a left-hand side end portion of the casing 112 by means of a screw. The shaft 121 is supported for rotation by a receiving member 120 secured to the display section 3 by means of a screw. Accordingly, the casing 112 assembled integrally with the casing 118 is mounted for turning motion on the display section 3 around an axis of the shaft 112A and the shaft 121. A cam 122 is connected to the shaft 121 (FIG. 9C) and is operable to switch the reversal switch 87 on or off. It is detected from the state of the reversal switch 87 whether the image pickup section 22 is directed to the front or to the rear.

Figure 10:
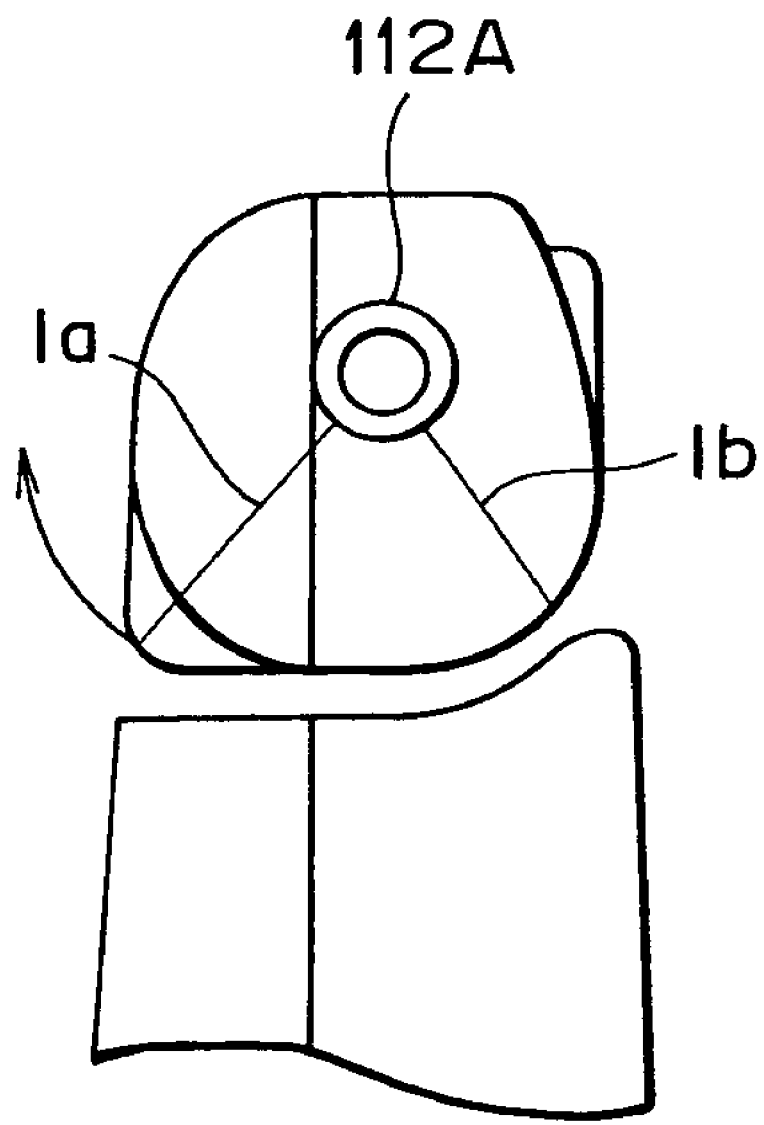
FIG. 10 is a view as viewed along line I—I' in a direction indicated by arrows showing the image pickup section shown in FIG. 9B.

FIG. 10 particularly shows the image pickup section 22 taken on line I—I' shown in FIG. 9A. As seen from FIG. 10, the shaft 112A (shaft 121) is formed (placed) at a position displaced a little upwardly and rearward from the center of a substantially cylindrical member formed from the casing 112 and the casing 118. Thus, the substantially cylindrical member is formed such that the casing 118 has the maximum dimension 1$a$ from the shaft 112A and the casing 112 has the minimum dimension 1$b$. Consequently, the image pickup section 22 can pivot in an outward direction (in the clockwise direction in FIG. 10), but cannot pivot in an inward direction (in the counterclockwise direction in FIG. 10).

FIG. 11A shows the personal computer 1 where the image pickup direction of the image pickup section 22 is set to the same direction as the LCD 21, and FIG. 11D shows the image pickup section 22 as viewed in a direction indicated by arrows along line I—I' of FIG. 11A in an enlarged scale. FIG. 11B shows the personal computer 1 where the image pickup direction of the image pickup section 22 is turned by 90 degrees in the clockwise direction with respect to the LCD 21, and FIG. 11E shows in an enlarged scale the image pickup section 22 of FIG. 11B as viewed in the direction indicated by the arrows along line I—I' of FIG. 11A. FIG. 11C shows the personal computer 1 where the image pickup section 22 is turned by 180 degrees in the clockwise direction with respect to the LCD 21, and FIG. 11F shows in an enlarged scale the image pickup section 22 of FIG. 11C as viewed in the direction indicated by the arrows along line I—I' of FIG. 11A.

A recess 141 is formed such that, even if the display section 3 is pivotally closed with respect to the body 2 while the lens-barrel section 102 remains projecting most from the casing 118, the image pickup section 22 can be turned without interfering with the body 2.

Figure 12:
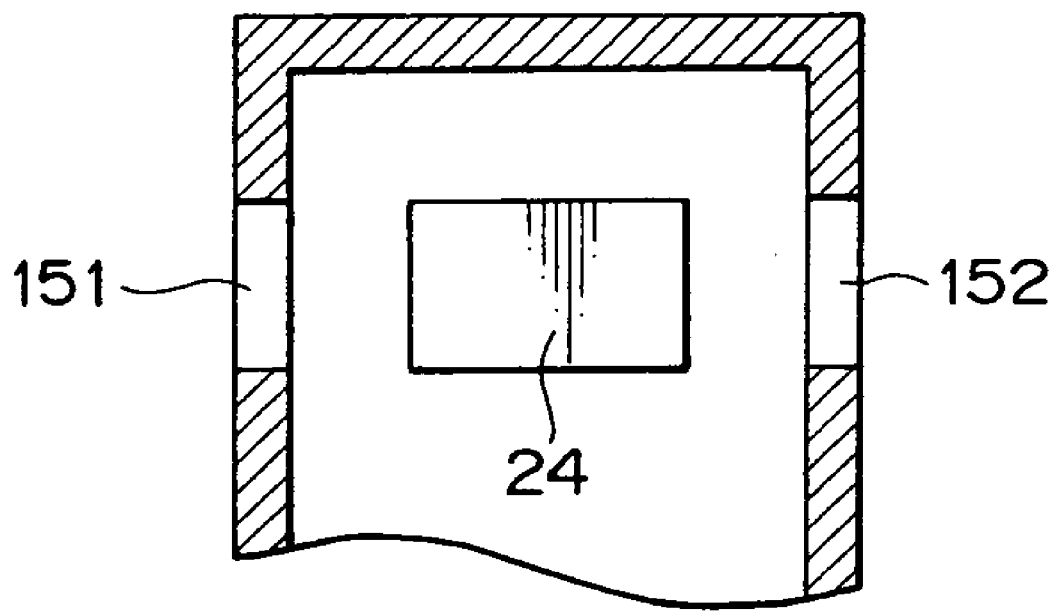
FIG. 12 is a schematic sectional view showing a microphone incorporated in the portable personal computer of FIG. 1.

FIG. 12 shows the microphone 24 as viewed in the direction indicated by the arrow marks in FIG. 11A along line I—I'. Referring to FIG. 12, the display section 3 has a slit 151 formed in a front wall thereof (along which the LCD 21 is provided) in front of the microphone 24, and has another slit 152 formed in a rear wall thereof (opposite to the LCD 21) in the rear of the microphone 24. Consequently, the microphone 24 can collect sound not only from the front side of the LCD 21 but also from the rear side of the LCD 21. It is to be noted that, in FIGS. 1, 2 and 6, a portion corresponding to the slit 151 or 152 of FIG. 12 is represented as the microphone 24 for the convenience of illustration.

FIGS. 13A to 13C show the image pickup section 22 when it is directed in different image pickup directions as viewed from the rear side of the display section 3. In particular, FIG. 13A shows the image pickup section 22 when it is directed in the opposite direction to the LCD 21. FIG. 13B shows the image pickup section 22 when it is in a position turned by 90 degrees from the direction of the LCD 21. FIG. 13C shows the image pickup section 22 when it is directed in the same direction as the LCD 21.

Figures 14A, 14B, 14C:
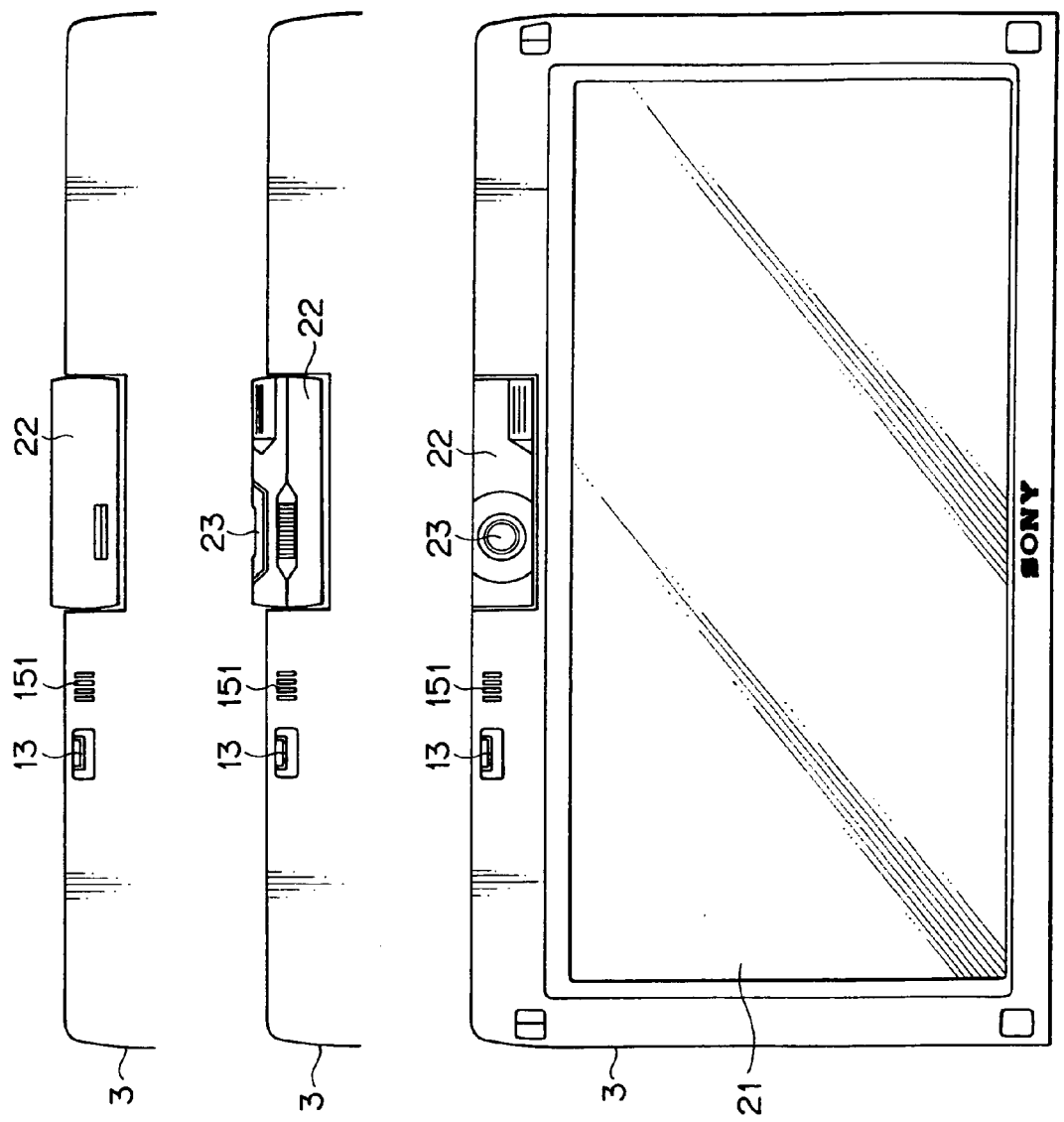
FIGS. 14A, 14B and 14C are partial schematic plan views and a schematic plan view illustrating pivotal movements of the image pickup section of FIG. 10 when the display section is pivotally opened with respect to the body.
Figure 15:
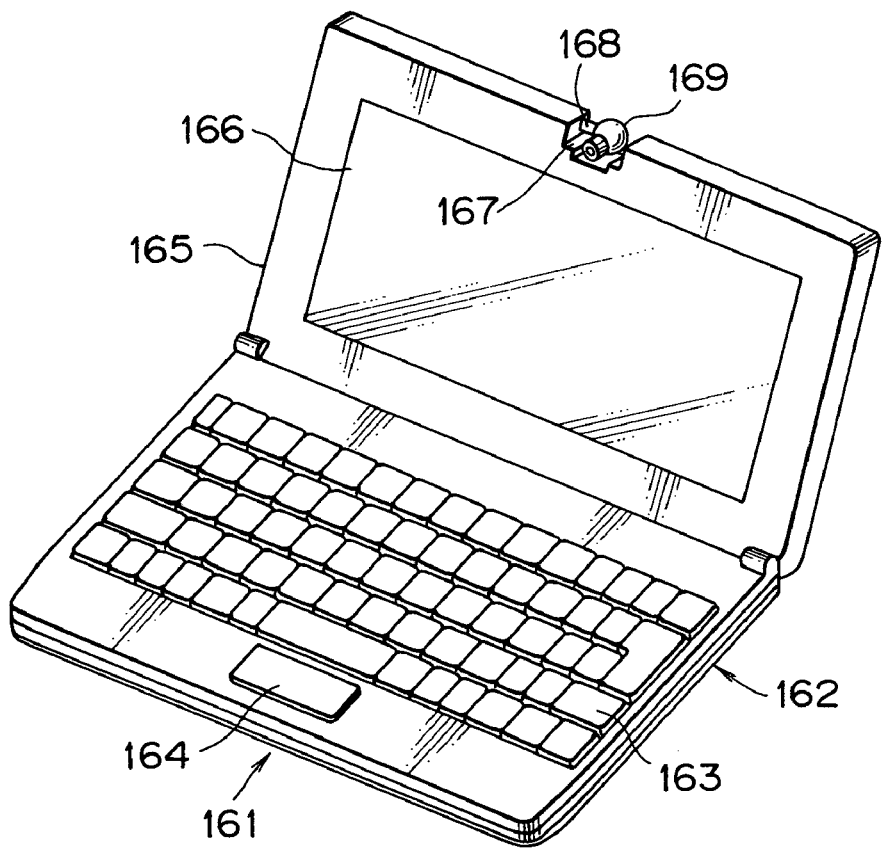
FIG. 15 is a perspective view of a related art portable personal computer when a display section is pivotally open with respect to a body.
Figure 16:
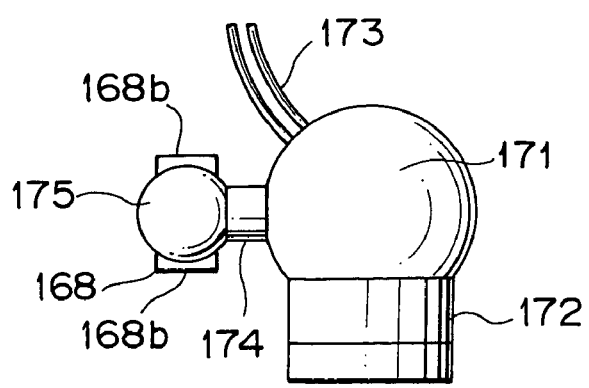
FIG. 16 is a partial schematic view of a CCD video camera incorporated in the portable personal computer shown in FIG. 15.

FIGS. 14A to 14C show the image pickup section 22 when it is directed in different image pickup directions as viewed from the front side of the display section 3. In particular, FIG. 14A shows the image pickup section 22 when it is directed in the opposite direction to the LCD 21. FIG. 14B shows the image pickup section 22 when it is in a position turned by 90 degrees from the direction of the LCD 21. FIG. 14C shows the image pickup section 22 when it is directed in the same direction as the LCD 21.

A method of using the personal computer 1 having the construction described above is described below. First, the display section 3 will be pivotally opened with respect to the body 2 until it extends substantially upwardly from the body 2 so that the user can see the LCD 21. In order to fetch an image of an object not shown into the personal computer 1, the user turns the CCD video camera unit 101 to an image pickup direction toward the object and stop it at a suitable position. Since the image pickup direction of the CCD video camera unit 101 can be set to any position within the range of 180 degrees from the direction same as that of the LCD 21 to the opposite direction (direction of the back of the LCD 21), the CCD video camera unit 101 can pick up not only an image of an object in front of the LCD 21, that is, the user of the personal computer 1, but also an image of an object around the same. After the CCD video camera unit 101 is set to the image pickup direction, the user turns the adjustment ring 25 to adjust the position of the lens-barrel section 102 so that the CCD video camera unit 101 may be focused on the object.

If the CCD video camera unit 101 is focused successfully on the object, then the user depress the shutter button 10 to pick up an image of the object with the CCD video camera 23. Image data thus obtained are stored into the hard disk drive (HDD) 56. The CCD video camera 23 supplies the image data of the object to the processing block 82. The processing block 82 processes the image data and then supplies them to the graphics chip 81. The graphics chip 81 stores the video data inputted thereto into the built-in VRAM 81A, and thereafter reads out and outputs them suitably to the LCD controller 83. The LCD controller 83 outputs the image data supplied thereto from the graphics chip 81 to the LCD 21 so as to be displayed on the LCD 21. Further, the image data captured by the CCD video camera may be printed by a printer not shown if necessary.

Further, the personal computer 1 may be connected to the communication network 92 through the modem 50, public telephone line 90 and Internet service provider 91 so that the image may be transmitted to a personal computer of the other party of communication. On the reception side, the image can be displayed on the real time basis based on the received image data. Therefore, the personal computer 1 can be utilized for a television conference system or a like system.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus having an image pickup apparatus incorporated therein,
   said information processing apparatus comprising a personal computer including a body section and a display panel section mounted for pivotal opening and closing movement on the body section,
   an image pickup apparatus mounted on a top edge portion of said display panel section,
   said image pickup apparatus comprising image pickup means for picking up an image of an object,
   holding means for holding thereon a lens for forming an image on said image pickup means,
   said holding means having a serrated circumferential portion thereon,
   moving means for fitting with said serrated circumferential portion of said holding means to move said holding means along a direction of an optical axis of said lens when said moving means is turned,
   accommodation means for accommodating said holding means and said moving means therein; and
   said moving means having at least a portion thereof exposed in order to permit a rotating operation when said image pickup apparatus faces one way and when said image pickup apparatus is turned to face an opposite direction to said display panel face, and
   wherein said body section has a recess which is formed such that, even if said display panel section is pivotally closed with respect to said body section, said image pickup apparatus can be turned without interfering with said body section.

2. An information processing apparatus according to claim 1, wherein said accommodation means is supported on said information processing apparatus for turning movement to any position within a range of 180 degrees from a direction same as the direction of display panel section of said information processing apparatus to the opposite direction to said display panel section.

3. An information processing apparatus according to claim 2, wherein said moving means is exposed from said accommodation means in such a manner as to be manually operable form above and from below of said accommodation means.

4. An information processing apparatus according to claim 1, wherein said image pickup means includes a CCD.

* * * * *